(12) United States Patent
Henderson et al.

(10) Patent No.: US 12,269,453 B2
(45) Date of Patent: Apr. 8, 2025

(54) METHOD FOR ESTIMATING VEHICLE MOTION STATE DURING A VEHICLE MANEUVER

(71) Applicant: VOLVO TRUCK CORPORATION, Gothenburg (SE)

(72) Inventors: Leon Henderson, Härryda (SE); Leo Laine, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 189 days.

(21) Appl. No.: 17/435,986

(22) PCT Filed: Mar. 7, 2019

(86) PCT No.: PCT/EP2019/055774
§ 371 (c)(1),
(2) Date: Sep. 2, 2021

(87) PCT Pub. No.: WO2020/177873
PCT Pub. Date: Sep. 10, 2020

(65) Prior Publication Data
US 2022/0176923 A1   Jun. 9, 2022

(51) Int. Cl.
*B60T 8/172* (2006.01)
*B60G 17/0195* (2006.01)
*B60T 8/17* (2006.01)

(52) U.S. Cl.
CPC .......... *B60T 8/172* (2013.01); *B60G 17/0195* (2013.01); *B60T 8/1708* (2013.01);
(Continued)

(58) Field of Classification Search
CPC .... B60T 8/172; B60T 8/1708; B60T 2210/12; B60T 2210/22; B60T 2210/36;
(Continued)

(56) References Cited

U.S. PATENT DOCUMENTS

| 7,734,406 | B1 | 6/2010 | Oppenheimer et al. |
| 2008/0086248 | A1* | 4/2008 | Lu ....................... B60T 8/17552 |
| | | | 701/41 |

(Continued)

FOREIGN PATENT DOCUMENTS

| CN | 108349467 A | 7/2018 |
| DE | 4230295 A1 | 3/1994 |

(Continued)

OTHER PUBLICATIONS

English Machine Translation of DE-102012202497 (Year: 2012).*
(Continued)

*Primary Examiner* — Andrew J Cromer
(74) *Attorney, Agent, or Firm* — Venable LLP; Jeffri A. Kaminski (57) ABSTRACT

A method in a vehicle for estimating vehicle motion state during a vehicle maneuver, comprising; obtaining a trigger signal indicating an onset of the vehicle maneuver, selecting a sub-set of wheels on the vehicle to be in a free-rolling condition, measuring one or more parameters related to revolution of the sub-set of wheels in free-rolling condition, and estimating the vehicle motion state based on the measured parameters.

19 Claims, 3 Drawing Sheets

(52) U.S. Cl.
CPC ....... *B60T 2210/12* (2013.01); *B60T 2210/22* (2013.01); *B60T 2210/36* (2013.01); *B60T 2240/06* (2013.01); *B60T 2250/03* (2013.01); *B60T 2270/406* (2013.01)

(58) Field of Classification Search
CPC ............. B60T 2240/06; B60T 2250/03; B60T 2270/406; B60G 17/0195
See application file for complete search history.

(56) References Cited

U.S. PATENT DOCUMENTS

| | | | | |
|---|---|---|---|---|
| 2010/0324776 | A1* | 12/2010 | Maire | ................... B61L 25/021 701/31.4 |
| 2011/0208424 | A1 | 8/2011 | Hirsch et al. | |
| 2018/0224851 | A1 | 8/2018 | Park | |

FOREIGN PATENT DOCUMENTS

| | | | | |
|---|---|---|---|---|
| DE | 19521411 | A1 | | 12/1996 |
| DE | 102004040757 | A1 | | 7/2005 |
| DE | 102012202497 | A1 | * | 5/2014 ............. B62D 7/144 |
| DE | 102013211243 | A1 | | 12/2014 |
| DE | 102014103843 | A1 | | 5/2015 |
| EP | 0621155 | A1 | | 10/1994 |
| EP | 2679458 | A2 | | 1/2014 |
| FR | 2862265 | A1 | | 5/2005 |
| GB | 2441423 | A | | 3/2008 |
| JP | H0769016 | A | | 3/1995 |
| JP | 2006327242 | A | | 12/2006 |
| JP | 2016060219 | A | | 4/2016 |
| WO | 0159430 | A1 | | 8/2001 |
| WO | 0192076 | A1 | | 12/2001 |

OTHER PUBLICATIONS

International Search Report and Written Opinion dated Nov. 5, 2019 in corresponding International PCT Application No. PCT/EP2019/055774, 10 pages.

International Preliminary Report on Patentability dated May 20, 2021 in corresponding International PCT Application No. PCT/EP2019/055774, 15 pages.

Japan Office Action dated Feb. 28, 2023 in corresponding Japan Patent Application No. 2021-552955, 10 pages.

Chinese Notice of Grant dated Nov. 24, 2023 in corresponding Chinese Patent Application No. 201980093384.7, 6 pages.

* cited by examiner

METHOD FOR ESTIMATING VEHICLE MOTION STATE DURING A VEHICLE MANEUVER

CROSS-REFERENCE TO RELATED APPLICATIONS

This application is a U.S. National Stage application of PCT/EP2019/055774, filed Mar. 7, 2019, and published on Sep. 10, 2020, as WO 2020/177873 A1, all of which is hereby incorporated by reference in its entirety.

TECHNICAL FIELD

The present disclosure relates to methods, control units and vehicles for estimating vehicle motion state parameters such as position, velocity and acceleration during a vehicle maneuver.

The invention can be applied in heavy-duty vehicles, such as semitrailers, trucks, buses and construction equipment. Although the invention will be described and exemplified mainly with respect to a tractor-semitrailer combination vehicle, the invention is not restricted to this particular vehicle, but may also be used in other vehicles such as rigid trucks, construction equipment, and the like.

BACKGROUND

Autonomous and semi-autonomous vehicles use various types of sensor input signals for navigation and vehicle control. Advanced driver assistance systems (ADAS) are also based on sensor input signals. If certain key sensor signals are lost which are necessary for safe operation of the vehicle, a safe stop maneuver is likely required. Safe stop maneuvers may comprise, e.g., maneuvering the vehicle to the side of the road and stopping the vehicle in a controlled manner. Since the vehicle may be at least partly 'blind' during the safe stop maneuver, control must sometimes be executed based on alternative input signals. One such alternative input signal is dead reckoning where wheel revolution is used to estimate, e.g., travelled distance, velocity, and acceleration.

US 2018/0224851 A1 relates to the problem of executing a safe stop maneuver in case a GPS signal is lost. A position estimate based on dead reckoning is used in case the primary positioning system is malfunctioning.

Tire slip, i.e., when a wheel skids on the road surface, presents a problem when using position estimation based on dead reckoning techniques. In case the wheel rotation of the vehicle does not accurately reflect the vehicle motion with respect to the road surface, estimation errors in both vehicle position, velocity, and acceleration can become large. To account for problems related to tire slip, US 2018/0224851 A1 proposes a tire slip prediction unit configured to predict a tire slip based on the wheel speed and the longitudinal speed of the vehicle. However, this tire slip prediction unit may not always yield an accurate and robust estimation of tire slippage. Consequently, there is a need for more robust methods for estimating vehicle motion state during, e.g., safe stop maneuvers.

SUMMARY

An object of the present disclosure is to provide methods for estimating vehicle motion state during a vehicle maneuver, such as a safe stop maneuver. This object is obtained by a method in a vehicle for estimating vehicle motion state during the vehicle maneuver. The method comprises obtaining a trigger signal indicating an onset of the vehicle maneuver. The method then comprises selecting a sub-set of wheels on the vehicle to be in a free-rolling condition and measuring one or more parameters related to revolution of the sub-set of wheels in free-rolling condition. The vehicle motion state is then estimated based on the measured parameters.

This way the effects of tire slippage are reduced, since the measurements are made on revolutions by one or more free-rolling wheels. The free-rolling wheels are not subject to, e.g., braking or accelerating forces, causing tire slippage. Thus, advantageously, no tire slippage prediction units or the like are needed and a more accurate dead reckoning estimation is obtained.

Advantageously, the method improves vehicle automation control, and allows for improvements in vehicle functional safety features.

It is appreciated that the selected wheels need not necessarily be placed in a total free rolling condition. Similar effects are obtained if the selected wheels are instead placed in a reduced force braking or acceleration operation compared to other wheels, i.e., less braking force is applied to the selected wheels in order to reduce tire slippage. Thus, notably, the selected wheels can be placed in a free-rolling condition without any acceleration or deceleration forces at all acting on the wheels, or they can be placed in a condition where only a reduced braking or acceleration force is applied to the wheels compared to forces applied to other wheels on the vehicle. Herein, a free-rolling condition and a reduced braking/acceleration force condition are considered as equivalents.

According to aspects, the vehicle maneuver is a safe stop maneuver requiring a controlled deceleration of the vehicle below a maximum deceleration capacity of the vehicle. The method is especially advantageous in the context of safe stop maneuvers. This is because safe stop maneuvers are often executed with a reduced braking force compared to maximum braking capacity in order to not stop the vehicle too abruptly, e.g., so as to reduce the risk of a rear end collision with a following vehicle. Consequently, there is extra braking capacity available which allows a sub-set of wheels to be in free-rolling condition or in a reduced braking condition while still allowing the vehicle to come to a full stop after the set braking distance.

According to aspects, the vehicle maneuver is a sensor calibration maneuver, whereby one or more sensor systems of the vehicle are arranged to be calibrated against the estimated motion state data. This way on-board sensors may use the ground truth offered by the wheels in free-rolling condition for calibration purposes. For instance, an acceleration sensor based on an inertial measurement unit (IMU) can be calibrated based on the acceleration measured on the wheels in the free-rolling condition.

According to other aspects, the method comprises estimating a road friction coefficient by comparing wheel revolution characteristics between the selected wheels in free-rolling condition and wheels where braking or acceleration forces are applied. A large difference indicates significant tire slippage, while driving conditions with good traction are likely to yield a smaller difference.

According to aspects, the subset of wheels is selected as the wheels on a selected wheel axle. Advantageously, when two wheels on the same axle are selected, vehicle turn rate can be estimated in addition to, e.g., longitudinal position, velocity and acceleration, by determining differences in revolution characteristics between the two wheels on the selected axle.

According to some such aspects, the selected wheel axle is the wheel axle associated with least vertical load compared to other wheel axles of the vehicle. This choice of wheel axle is advantageous in that the braking capacity of the wheels on an axle with reduced load is already reduced and cannot contribute as much to vehicle braking compared to other wheels on axles associated with higher axle loads. Consequently, impact on vehicle braking capacity is reduced.

According to other such aspects, the selected wheel axle is a wheel axle associated with low rotational inertia compared to other axles. This way, advantageously, the axle will quickly reach a free rolling condition, even if it starts from a fully braked condition.

According to other such aspects, the selected wheel axle is a liftable wheel axle, and the method comprises lowering the liftable wheel axle prior to measuring the parameters. A liftable wheel axle in raised position does not support the vehicle and cannot be used for braking purposes. Consequently, it can be used for estimating vehicle motion state with a minimum impact on vehicle maneuverability, which is an advantage.

According to aspects, the method also comprises adjusting a suspension air pressure associated with the selected axle by an amount. The suspension air pressures can be manipulated to lighten or increase the load on an axle to be used as the free-rolling axle. A lightened load results in reduced loss of overall braking capability of the vehicle, while an increased load results in increased friction between road surface and tires, and therefore less tire slippage.

According to aspects, the subset of wheels is selected from different wheel axles of the vehicle and from different sides of the vehicle. Advantageously, this particular selection may increase vehicle stability and. This selection can also be used to improve axle-wise braking balance compared to the case where both wheels on the same axle are unbraked, which is an advantage. Selecting wheels on the far corners of the vehicle may also improve the estimation of yaw rate, as with this choice the difference in measured wheel speeds would be greater. Also, this type of diagonal braking may be preferred in order to even out axle load on a two axle truck system or trailer system. Also, this type of diagonal braking may be preferred in order to even out axle load on a two axle truck system or trailer system.

According to aspects, the wheels comprised in the subset of wheels is selected in dependence of vehicle stability, whereby the subset of wheels is selected to give an acceptable impact on vehicle stability depending on maneuver scenario. It is an advantage to make an informed choice of which wheels to put in reduced braking mode or in free-rolling condition based on vehicle stability and maneuver scenario. Some choices of wheels in free-rolling condition may be disadvantageous in that vehicle stability is negatively affected.

According to aspects, the subset of wheels is selected as a single wheel. It is appreciated that the sub-set of wheels may only comprise a single wheel. In fact, the sub-set of wheels may comprise any number of wheels from one wheel and up. In fact, some maneuvers, like sensor calibration maneuvers, may allow for all wheels to be in free-rolling condition. When a single wheel is selected to be in free-rolling condition, it may be advantageous to fuse information obtained from the single wheel with data from other sensors. For instance, a compass heading value obtained from a compass unit may be used to infer turn rate and track curvature, which motion state parameters cannot be estimated from a single wheel alone.

According to some aspects, the method comprises controlling the vehicle to execute the maneuver based on the estimated motion state and on a preferred maneuver track to be followed. Thus, there is disclosed herein methods for controlling the vehicle during the maneuver in addition to the methods for estimating vehicle motion state.

According to some other aspects, the method also comprises verifying a deceleration value in the motion state against a preferred deceleration value for the maneuver. Consequently, as the maneuver is being executed, it is ensured that the target deceleration value is as intended. Advantageously, a more robust operation is therefore obtained.

According to further aspects, the method further comprises estimating a road banking grade and/or a road slope based on the measured parameters and on obtained accelerometer data associated with the vehicle.

There are also disclosed herein control units, computer programs, and vehicles associated with the above mentioned advantages.

Further advantages and advantageous features of the invention are disclosed in the following description and in the dependent claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Herein, a vehicle motion state is assumed to describe the present state of the vehicle in terms of, e.g., position, velocity, acceleration, and turn-rate. The vehicle motion state may also comprise other quantities such as current road friction properties, current braking capacity depending on road conditions and the like. In general, vehicle motion state comprises any of; global or relative position coordinates, vehicle heading, vehicle trajectory curvature, vehicle longitudinal speed, vehicle longitudinal acceleration, vehicle yaw rate, and various environment variables. Vehicle motion states in general, vehicle motion state estimation based on sensor input signals, and the like is known and will therefore not be discussed in more detail herein.

Herein, a semi-trailer may refer to the trailer part of a tractor and semitrailer combination vehicle, or it may refer to the whole tractor and semitrailer combination vehicle. The vehicle powering the semi-trailer is referred to as the towing vehicle or as the tractor vehicle.

In order to ensure that a vehicle motion management (VMM) system can always control the motion of a highly automated vehicle, redundancy is often provided to cover at least parts of the vehicle control system. During normal vehicle operation, sensors such as radar sensors, lidar sensors, global positioning system (GPS) sensors and the like provide input data to a primary control unit which bases its control decisions on the sensor input.

If the sensor input signals are lost for some reasons, or if the primary control unit brakes down, the secondary redundant control system kicks in. In case of sensor signal outage, the vehicle is essentially blind and must operate for a limited time duration without sensor input. A safe stop maneuver is then executed to stop the vehicle in a controlled manner. The most important vehicle motion states that need to be estimated during a safe stop maneuver are: global position in two coordinates (x and y or longitudinal and latitudinal position), vehicle heading, trajectory curvature, vehicle longitudinal speed and yaw rate. Knowing these quantities, the vehicle can follow the last known path, or a path determined based on old data, and thus be less likely to exit a safe driving area.

Known approaches to estimate these vehicle motion state quantities in the event of loss of global localization information (from GPS, camera, etc) is to use inertial sensor information from accelerometers and angular rate sensors, along with wheel speed information to perform 'dead-reckoning' based on the last known global position of the vehicle.

There are several possible sources of error that can lead to large drifting of the estimated position which are common in this approach. The acceleration and angular rate signals must be integrated in order to obtain position and speed info. Any offset or error in a signal will be integrated over time, resulting in larger and larger errors in position and speed estimates. The sensor signals are also generally noisy and contain both biases and errors from, e.g., gravity influence, heat, and the like. To make matters worse, during braking and propulsion of the vehicle, relative slip or skidding will occur between the tires and the road surface. In this situation the wheel rotational speeds will not equal the vehicle's actual speed over ground. This will result in large errors in vehicle speed estimate and longitudinal position, especially when the road surface is slippery.

Figure 1:
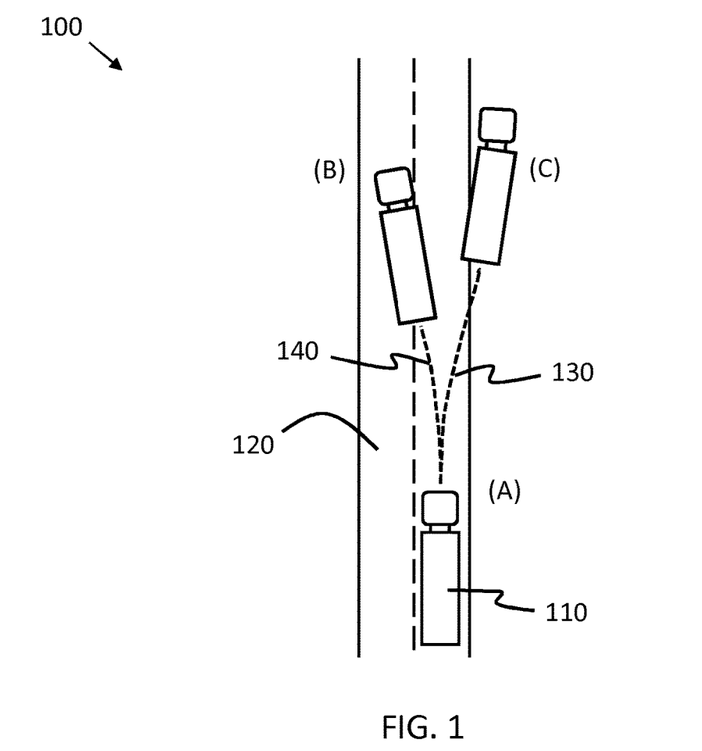
FIG. 1 schematically illustrate vehicle maneuvers.

FIG. 1 shows an example scenario 100 where an articulated vehicle 110 loses sensory input at a location (A). A safe stop maneuver is therefore triggered, with the purpose to steer 130 the vehicle 110 onto a road shoulder and bring the vehicle to a full stop at location (C) in a controlled manner. A dangerous situation would result if the vehicle 110 veers 140 into the opposite lane 120 where it may collide with meeting traffic. Such veering may be the result of accumulated errors during dead reckoning, especially if the road surface is slippery.

Figure 2:
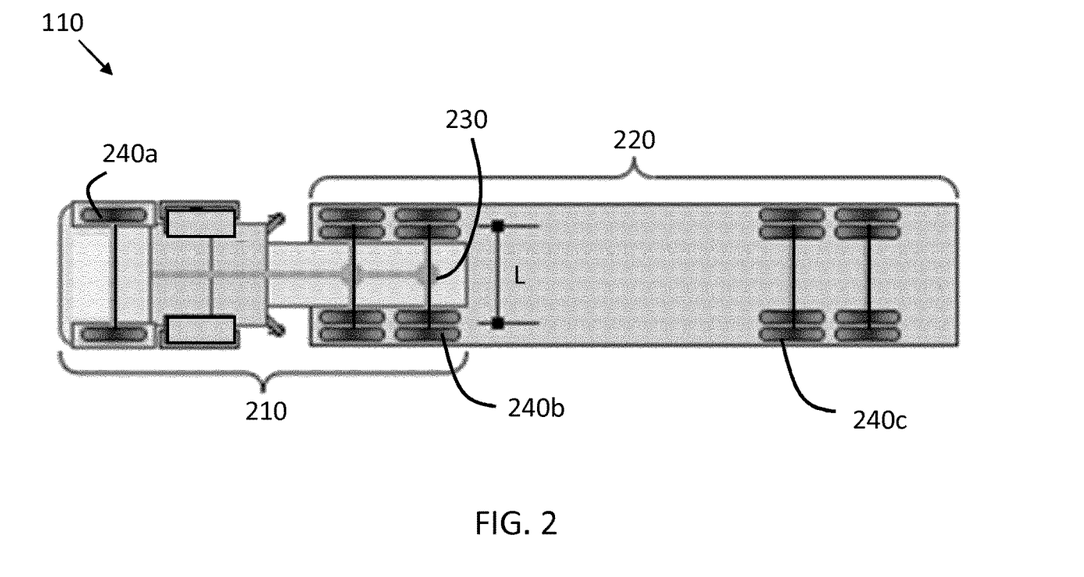
FIG. 2 shows an example tractor and semi-trailer combination vehicle.

FIG. 2 illustrates the articulated vehicle 110 in more detail. The vehicle comprises a towing truck 210 and a trailer unit 220. The towing truck here comprises three wheel axles, where one wheel axle may be a liftable wheel axle, i.e., it may be raised such that the wheels leave the ground when it is not needed to carry weight. One or more of the wheel axles may comprise actively driving wheels. Often, all wheels are capable of decelerating the vehicle 110.

As will be discussed in more detail below, certain sub-sets of wheels may be selected to be in a free-rolling condition, or at least be in a condition associated with a reduced braking or acceleration operation compared to other wheels on the vehicle 110. Such a selection may comprise selecting the wheels on a single axle 230, or selecting wheels on different axles 240a, 240b, or even selecting a single wheel 240c.

The nominal maximum braking performance of a truck on a dry road is about 7 m/s$^2$. On a wet road this number may be lowered to about 4 m/s$^2$. Truck combinations typically have more than 2 axles, e.g., for a tractor and semitrailer combination there are typically 5 or 6 axles. It therefore becomes possible to take advantage of the fact that the maximum deceleration request for a safe stop will be limited to about 3 m/s$^2$, which acceleration can be achieved even in wet road conditions, while leaving two wheels on the vehicle unbraked, i.e., in a free-rolling condition. For example, if the vehicle has 5 equally laden axles, and the nominal maximum deceleration that can be achieved with all wheels active is 5 m/s$^2$ (limited by tire-road friction) then with one axle unbraked a deceleration of $4/5*5$ can still be achieved, i.e., 4 m/s$^2$ which is well above the 3 m/s$^2$ requirement for a safe stop maneuver.

In other words, suppose that a safe stop maneuver is requiring a deceleration of 3-4 m/s$^2$ and that maximum truck deceleration is 7-8 m/s$^2$. Then, with a three axle truck, a whole axle can be unbraked or the diagonal wheels unbraked on a two axle system.

In case wheels on different axles are selected, then it may be necessary to compensate the wheel speeds for inner and outer radius.

In a vehicle with many axles such as the vehicle 110 shown in FIGS. 1 and 2, any of the axles could be selected to 'free-roll'. The decision criteria as to which axle to select could for example be based on any of;
  axle load, e.g., selecting axle with lowest load, or with the least impact on vehicle stability,
  the axle whose position is of most interest to the path follower algorithm, Instead of 'free rolling' two wheels on the same axle, for some vehicle layouts it may be advantageous to 'free-roll' wheels at opposite corners of the vehicle (e.g. the front left and rear right). This may result in a more stable braking situation, particularly in the case of a short wheel base tractor unit. When combined with knowledge of the vehicle's wheelbase length this may also provide a more accurate position estimate. The wheel speed information can optionally be fused with accelerometer and/or angular rate sensor information, e.g. in a Kalman filter or a particle filter, to improve dead reckoning accuracy further.

The wheel speed information could be used as the only sensor information for blind stop navigation, which is an advantage since it yields a system with very low cost. Steering angle information from, e.g., a steering angle sensor, could also be combined with the sensors mentioned above to further improve the estimate of heading angle.

Figure 3:
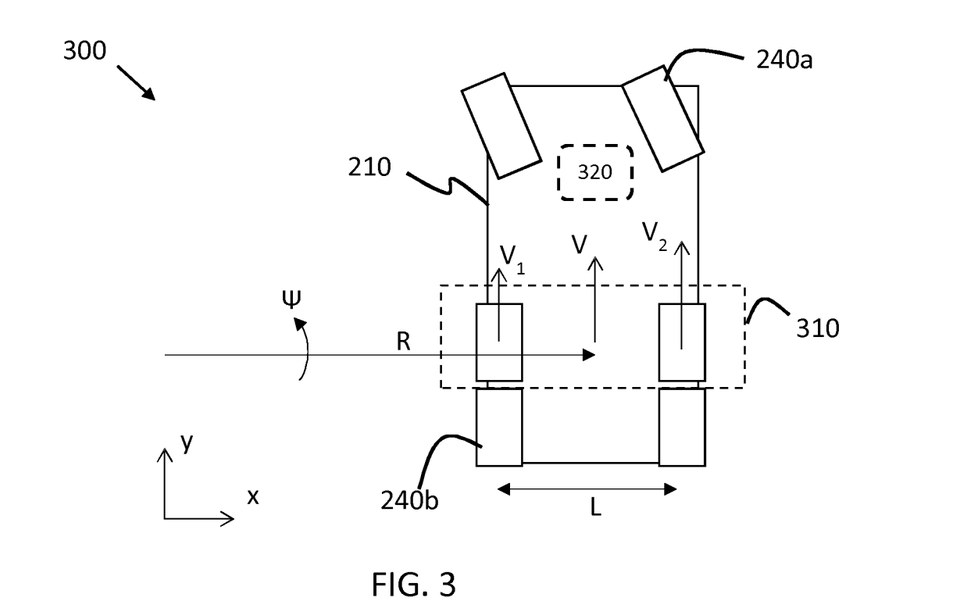
FIG. 3 schematically illustrates a tractor vehicle.

FIG. 3 schematically illustrates a vehicle 210 in a turn scenario 300, where the vehicle is executing a turn with curvature 1/R. The vehicle comprises a control unit 320 arranged to perform the herein disclosed techniques. Further details of the control unit 320 will be discussed below in connection to FIG. 5. Here, the wheels on axle 310 has been selected to be in a free rolling condition and are being used to estimate vehicle motion state. The leftmost wheel on the axle is associated with a velocity $V_1$, while the rightmost wheel is associated with a velocity $V_2$. A vehicle motion state parameter V, which is a velocity in longitudinal direction, i.e., in the forward direction of the vehicle, is to be estimated.

Wheel rotation speeds such as $V_1$ and $V_2$ can be measured by a wheel speed sensor (VSS) which is often implemented by some type of tachometer. It is a sender device used for reading the speed of a vehicle's wheel rotation, which usually consists of a toothed ring and a pickup device. A common wheel speed sensor system consists of a ferromagnetic toothed reluctor ring (also known as a tone wheel) and a sensor which can be either passive or active. Wheel speed sensors are known and will not be discussed in more detail herein.

With reference to FIG. 3, according to an example of the herein disclosed techniques, a method for carrying out a safe stop maneuver is as follows:

Select an axle 310 on the main towing unit (the truck), such as the axle with the least amount of vertical load. Keep the brakes on this axle disabled throughout the safe stop maneuver.

Use the free-rolling wheels on the unbraked axle to measure the longitudinal vehicle speed-over-ground directly, e.g. taking the average of the two speeds $V_1$ and $V_2$.

Use this measured vehicle speed V to estimate: longitudinal vehicle position (integrate V), as well the longitudinal acceleration of the vehicle (differentiate V).

Use the difference between the wheel speeds measured on the free-rolling axle, and the vehicle's known wheel base, to estimate the curvature of the vehicle's current trajectory. The curvature 1/R at the center of the free-rolling axle is given by $$R = \frac{L}{2} \frac{V_1 + V_2}{V_2 - V_1},$$

where L is me axle wheel distance also shown in FIG. 2, $V_1$ is the measured velocity of the first wheel, and $V_2$ is the measured velocity of the second wheel. These geometrical relationships are known and will not be discussed in more detail here.

Yaw rate $\dot{\Psi}$ can then be calculated as $$\dot{\Psi} = \frac{V}{R}.$$

This yaw rate estimate can of course be 'fused' with any available yaw rate sensors on the vehicle to improve accuracy, and then integrated to get the heading angle of the vehicle during the course of the safe stop. Herein, by fusing two estimates is meant that the two estimates are used to jointly estimate a common value. Fusing commonly amounts to weighting the two values based on relative accuracy. Sensor fusion algorithms are known and will not be discussed in more detail here.

If a rear axle of the vehicle is braked, the position and orientation of the vehicle can for example be calculated at each time step during the safe stop using common equations:

$$\Psi_t = \Psi_{t-1} + dt \dot{\Psi},$$

$$x_t = x_{t-1} + dt(V_t \cos(\Psi)),$$

$$y_t = y_{t-1} + dt(V_t \sin(\Psi)),$$

$$a_x = (V_t - V_{t-1})/dt,$$

where dt is the timestep of the estimation algorithm, $x_t$ represents latitudinal position at time t, $y_t$ represents longitudinal position at time t, $V_t$ represents vehicle velocity at time t, and $a_x$ is acceleration in latitudinal direction. The directions x and y are indicated in FIG. 3.

The position and heading angle $\Psi$ can be used directly by a path follower to follow a desired blind stop trajectory.

The $a_x$ value and $V_t$ can be used by the brake system. These are important inputs to ensure correct deceleration values are reached, and to ensure that the antilock braking algorithm can function properly.

The techniques disclosed herein can also be used to estimate a road banking grade and/or a road slope based on the measured parameters and on obtained accelerometer data associated with the vehicle.

Figure 4:
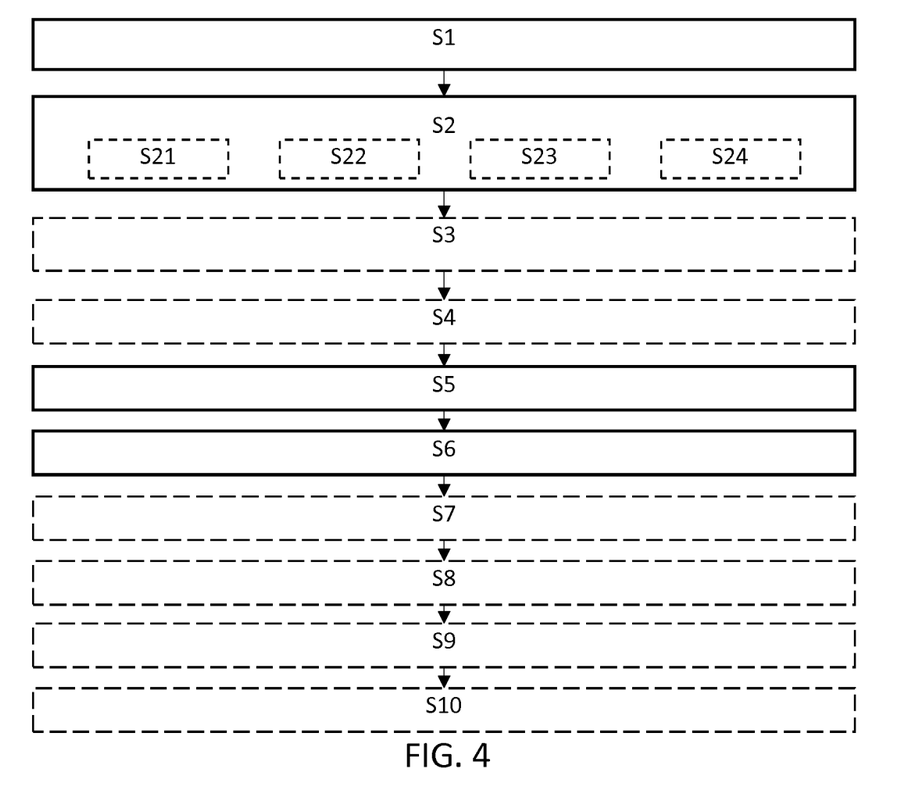
FIG. 4 is a flow chart illustrating methods.

FIG. 4 is a flow chart illustrating various methods which generalize the above discussed example operations. There is illustrated a method in a vehicle 110, 210 for estimating vehicle motion state during a vehicle maneuver. The method comprises obtaining S1 a trigger signal indicating an onset of the vehicle maneuver. This trigger signal may, e.g., be obtained from an external source, from an interface operable by a driver in the cabin such as an emergency brake button, or it may be generated internally in the control unit 320 following sensor signal outage. The trigger signal may also be received from a remote source via, e.g., wireless signal transmission over a cellular network or the like.

According to some aspects, the vehicle maneuver is a safe stop maneuver requiring a controlled deceleration of the vehicle below a maximum deceleration capacity of the vehicle.

According to some other aspects, the vehicle maneuver is a sensor calibration maneuver, whereby one or more sensor systems of the vehicle are arranged to be calibrated against the estimated motion state data. Both safe stop maneuvers and sensor calibration maneuvers were discussed above.

The method also comprises selecting S2 a sub-set of wheels on the vehicle to be in a free-rolling condition or at least in a reduced braking condition. It is appreciated that wheels in free-rolling condition may be preferred in order to minimize error sources due to tire slippage. However, the method does not require fully free-rolling wheels, but also functions well in case a braking operation with reduced magnitude is actuated via the selected sub-set of wheels.

The sub-set of wheels may be selected differently depending on circumstances and wanted effects; for instance, according to some aspects, the subset of wheels is selected S21 as the wheels on a selected wheel axle 230. By selecting two or more wheels on both sides of the vehicle, track curvature, yaw rate, and the like can be estimated, as was illustrated and discussed in connection to FIG. 3 above. The selected wheel axle 230 may be the wheel axle associated with least vertical load compared to other wheel axles of the vehicle. This is a preferred choice in case loss in braking capability is to be minimized, since the wheel axle with least load is likely to yield less braking force effect compared to a wheel axle which is more heavily loaded.

The selected wheel axle 230 may also be a liftable wheel axle. In this case, the method comprises lowering S3 the liftable wheel axle prior to measuring the parameters. The liftable wheel axle is an 'extra' wheel axle which is only used in case the vehicle is heavily loaded. Thus, in case it is not already in use, it can be lowered and used to estimate vehicle motion state without significant impact on, e.g., vehicle braking capability or the like.

The selected sub-set of wheels may further comprise wheels from different wheel axles of the vehicle and from different sides of the vehicle 240a, 240b. This type of selection may improve on vehicle stability during the maneuver, which is an advantage.

It is appreciated that the subset of wheels may comprise any number of wheels, from one wheel and up. Thus, according to some aspects, the subset of wheels is selected S24 as a single wheel. According to other aspects, e.g., when calibrating sensors, the sub-set of wheels can be selected as all wheels of the vehicle.

According to some aspects, wheels comprised in the subset of wheels is selected S23 in dependence of vehicle stability, whereby the subset of wheels is selected to give an acceptable impact on vehicle stability depending on maneuver scenario.

The method also comprises measuring S5 one or more parameters related to revolution of the sub-set of wheels in free-rolling condition and estimating S6 the vehicle motion state based on the measured parameters.

Of course, should some sensor input signals be available, sensor fusion algorithms can be applied in order to fuse information from the dead reckoning system based on the free-rolling subset of wheels with the information obtained from the available sensors. Consequently, it is appreciated that the disclosed techniques are also applicable in cases where sensor input signals from, e.g., radar sensors, lidar sensors, vision sensors and GPS is available.

According to some aspects, the method comprises adjusting S4 a suspension air pressure associated with the selected axle 230 by an amount. For instance, suspension air pressure may be adjusted so as to reduce load on a selected wheel axle, thereby reducing negative impact on braking capability of the vehicle. According to other aspects, wheel axle load on a selected wheel axle may be increased in order to increase friction between free-rolling wheels and the road surface, thereby further reducing errors due to wheel slip.

In addition to estimating vehicle motion state, the method may also comprise controlling S7 the vehicle 110 to execute the maneuver based on the estimated motion state and on a preferred maneuver track to be followed. This controlling may comprise using a last known path, or recent information about vehicle surroundings together with the estimated vehicle motion state in order to execute a controlled safety stop maneuver. For instance, with reference again to FIG. 1, when the vehicle loses sensor input signal at location (A), the environment some distance ahead of the vehicle is likely known. Thus, the control unit 350 knows how the road extends some distance in front of the vehicle 110 at location (A) and can therefore determine a suitable path 130 for the safe stop maneuver. The control unit can then control steering and braking in order to follow the determined path 130 based on the estimated travelled distance from location (A), vehicle velocity, and vehicle turn rate. Thus, a safe stop maneuver from location (A) to location (B) following path 130 can be executed despite the vehicle being blind in the sense that, e.g., GPS, vision, radar, and/or lidar sensor input is no longer available. Consequently, veering into the more dangerous path 140 is avoided despite sensor signal outage.

According to some other aspects, the method comprises verifying S8 a deceleration value in the motion state against a preferred deceleration value for the maneuver. This means that the vehicle can obtain information about if the current deceleration is reasonable, or if adjustments to braking action should be made in order to increase or decrease vehicle deceleration during the maneuver.

According to some further aspects, the method further comprises estimating S9 a road banking grade and/or a road slope based on the measured parameters and on obtained accelerometer data associated with the vehicle. If combined with accelerometer data from, e.g., an inertial measurement unit (IMU), the speed measured from the selected wheels can be used to estimate road banking grade/slope.

According to other aspects, the method comprises estimating S10 a road friction coefficient by comparing wheel revolutions between wheels in free-rolling condition and wheels where braking or acceleration forces are applied. In case the free-rolling wheels are behaving differently with respect to, e.g., revolution speed compared to the braking wheels, then a slippery road surface can be suspected. Also, if no significant difference in wheel revolution characteristics are measured between the free-rolling wheels and the braking wheels, then it can be inferred that road friction conditions are favorable for braking operations.

Figure 5:
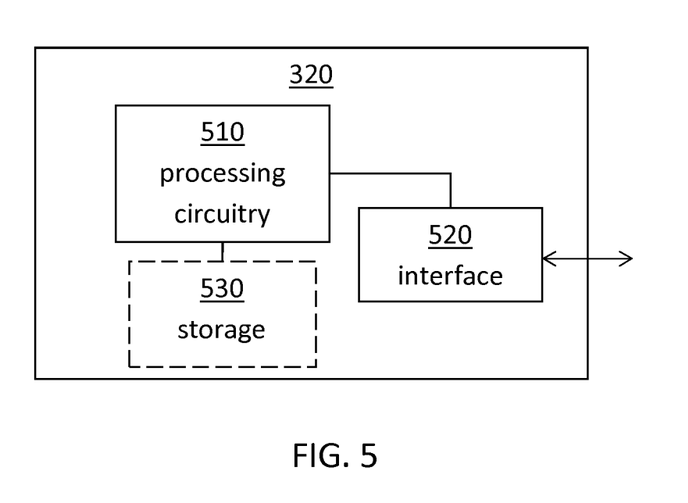
FIG. 5 schematically illustrates a control unit.

FIG. 5 schematically illustrates, in terms of a number of functional units, the components of a control unit 320 according to embodiments of the discussions herein. Processing circuitry 510 is provided using any combination of one or more of a suitable central processing unit CPU, multiprocessor, microcontroller, digital signal processor DSP, etc., capable of executing software instructions stored in a computer program product, e.g. in the form of a storage medium 530. The processing circuitry 510 may further be provided as at least one application specific integrated circuit ASIC, or field programmable gate array FPGA.

Particularly, the processing circuitry 510 is configured to cause the control unit 320 to perform a set of operations, or steps, such as the methods discussed in connection to FIG. 4. For example, the storage medium 530 may store the set of operations, and the processing circuitry 510 may be configured to retrieve the set of operations from the storage medium 530 to cause the control unit 320 to perform the set of operations. The set of operations may be provided as a set of executable instructions. Thus, the processing circuitry 510 is thereby arranged to execute methods as herein disclosed.

The storage medium 530 may also comprise persistent storage, which, for example, can be any single one or combination of magnetic memory, optical memory, solid state memory or even remotely mounted memory.

The control unit 320 may further comprise an interface 520 for communications with at least one external device, such as the antenna array comprising the phase controllers and the mechanically rotatable base plate. As such the interface 520 may comprise one or more transmitters and receivers, comprising analogue and digital components and a suitable number of ports for wireline or wireless communication.

The processing circuitry 510 controls the general operation of the control unit 320, e.g., by sending data and control signals to the interface 520 and the storage medium 530, by receiving data and reports from the interface 520, and by retrieving data and instructions from the storage medium 530. Other components, as well as the related functionality, of the control node are omitted in order not to obscure the concepts presented herein.

The control unit 320 optionally comprises a heading detection unit, such as a compass or GPS module. The control unit may also comprise an IMU. The input from these sensors may be fused with the estimates obtained from the wheel rotation measurements.

Figure 6:
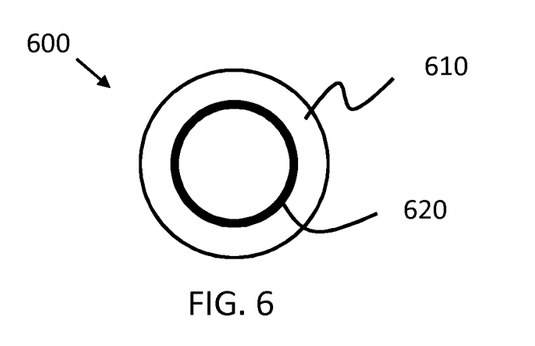
FIG. 6 shows an example computer program product.

FIG. 6 illustrates a computer readable medium 610 carrying a computer program comprising program code means 620 for performing the methods illustrated in FIG. 4, when said program product is run on a computer. The computer readable medium and the code means may together form a computer program product 600.

The invention claimed is:

1. A computer implemented method in a vehicle, the vehicle including a primary system, for estimating vehicle motion state during a vehicle maneuver when the primary system is not available,
wherein the vehicle motion state comprises vehicle position, the method comprising;
determining that the primary system is unavailable;
obtaining a trigger signal indicating an onset of the vehicle maneuver,
lowering a liftable wheel axle,
controlling at least one wheel on the liftable wheel axle, to be in a free-rolling condition, wherein the free-rolling condition comprises reduced braking,
measuring one or more parameters related to revolution of the at least one wheel on the liftable wheel axle in free-rolling or reduced braking condition, and
estimating the vehicle motion state based on the measured parameters.

2. The computer implemented method according to claim 1, wherein the vehicle maneuver is a safe stop maneuver requiring a controlled deceleration of the vehicle below a maximum deceleration capacity of the vehicle.

3. The computer implemented method according to claim 1, wherein the vehicle maneuver is a sensor calibration maneuver, whereby one or more sensor systems of the vehicle are arranged to be calibrated against the estimated motion state.

4. The computer implemented method according to claim 1, wherein the at least one wheel is selected as all wheels on the liftable wheel axle.

5. The computer implemented method according to claim 4, wherein the liftable wheel axle is the wheel axle associated with least vertical load compared to other wheel axles of the vehicle.

6. The computer implemented method according to claim 4, wherein the liftable wheel axle is a wheel axle associated with low rotational inertia compared to one or more other axles of the vehicle.

7. The computer implemented method according to claim 4, comprising adjusting a suspension air pressure associated with the selected axle by an amount.

8. The computer implemented method according to claim 1, wherein the at least one wheel is selected from different wheel axles of the vehicle and from different sides of the vehicle.

9. The computer implemented method according to claim 1, wherein the at least one wheel is selected in dependence of vehicle stability, whereby the subset of wheels is selected to give an acceptable impact on vehicle stability depending on maneuver scenario.

10. The computer implemented method according to claim 1, wherein the at least one wheel comprises a single wheel.

11. The computer implemented method according to claim 1, wherein the vehicle motion state comprises any of; global or relative position coordinates, vehicle heading, vehicle trajectory curvature, vehicle longitudinal speed, vehicle longitudinal acceleration, and vehicle yaw rate.

12. The computer implemented method according to claim 1, comprising controlling the vehicle to execute the maneuver based on the estimated motion state and on a preferred maneuver track to be followed.

13. The computer implemented method according to claim 1, comprising verifying a deceleration value in the motion state against a preferred deceleration value for the maneuver.

14. The computer implemented method according to claim 1, further comprising estimating a road banking grade and/or a road slope based on the measured parameters and on obtained accelerometer data associated with the vehicle.

15. The computer implemented method according to claim 1, further comprising estimating a road friction coefficient by comparing wheel revolution characteristics between the selected wheels in free-rolling condition and other wheels where braking or acceleration forces are applied.

16. A non-transitory computer readable medium carrying a computer program comprising program code for performing the steps of claim 1 when said program product is run on a computer.

17. A control unit for estimating vehicle motion state during a vehicle maneuver, the control unit being configured to perform the steps of the computer implemented method according to claim 1.

18. A vehicle comprising a control unit according to claim 17.

19. The computer implemented method according to claim 1, further comprising generating the trigger signal when it is determined that the primary system is unavailable.

* * * * *